Jan. 11, 1955 C. R. TURNER 2,699,487
TEMPERATURE RESPONSIVE CONTROL DEVICE
Filed Feb. 15, 1951 2 Sheets-Sheet 1
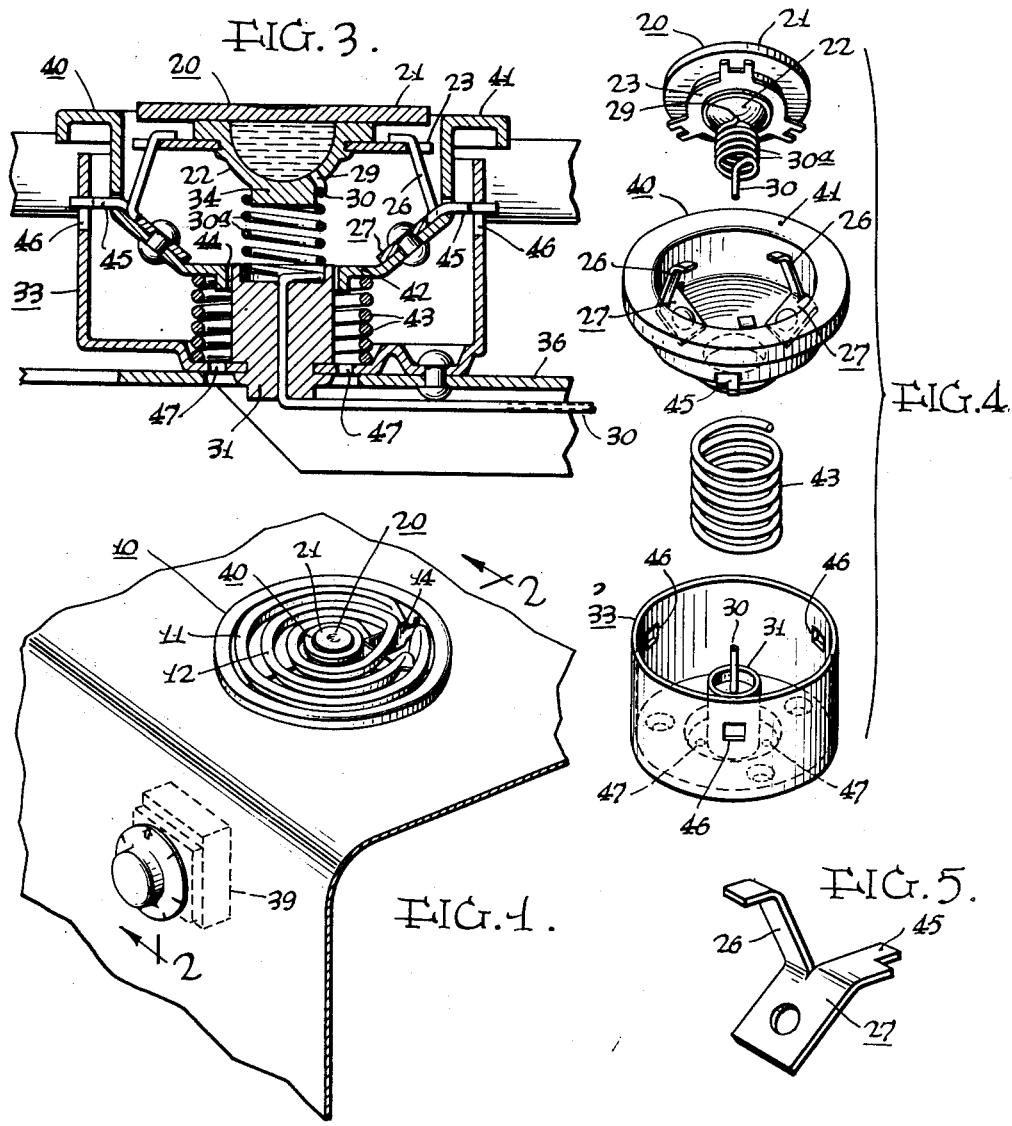
Inventor:
Charles Roger Turner
by his Attorneys
Howson & Howson

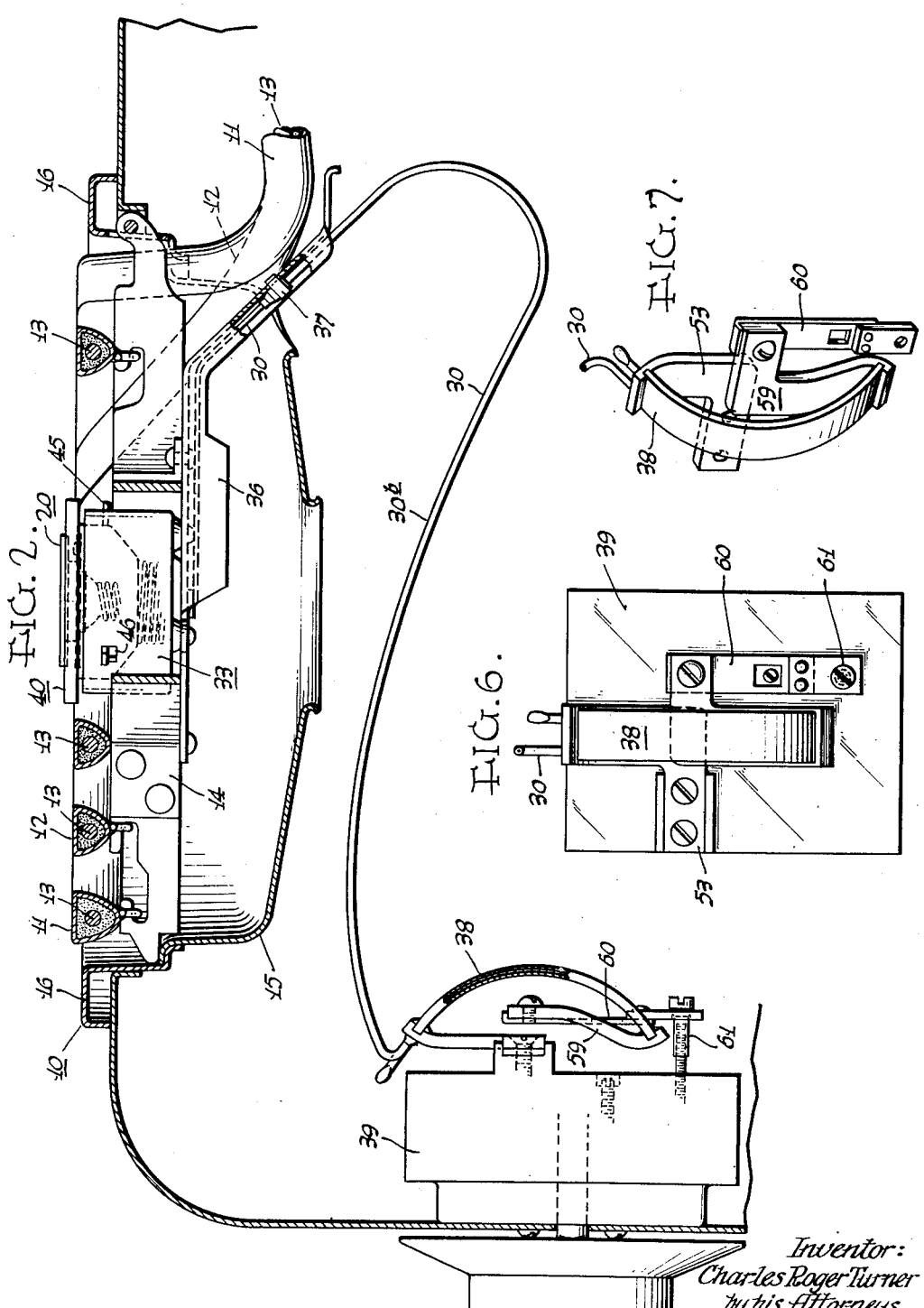

United States Patent Office 2,699,487
Patented Jan. 11, 1955

2,699,487

TEMPERATURE RESPONSIVE CONTROL DEVICE

Charles Roger Turner, Springfield Township, Montgomery County, Pa., assignor to Proctor Electric Company, Philadelphia, Pa., a corporation of Pennsylvania Application February 15, 1951, Serial No. 211,083

6 Claims. (Cl. 219—37)

This invention relates to the thermostatic control of a cooking vessel, and more particularly to an improved vessel surface temperature responsive device adapted to be located in close proximity to the heat source for the vessel.

The principal object of the invention is to provide an efficient control device for use in conjunction with a surface cooking unit having a small central opening.

The present invention has as a further main object the provision in such a device of an improved shielding arrangement for the vessel temperature responsive element.

Other objects and features will become apparent from the description to follow when considered in connection with the accompanying drawings, in which:

Fig. 1 is a perspective view of a portion of an electric range, showing a surface heating unit to which the invention is applied and a control device therefor;

Fig. 2 is a larger-scale sectional view taken along line 2—2 of Fig. 1;

Fig. 3 is an enlarged fragmentary sectional view taken centrally through the vessel temperature responsive mechansim;

Fig. 4 is an exploded view of the elements of the same;

Fig. 5 is a perspective view of a motion limiting lug;

Fig. 6 is a rear elevational view of the control switch showing the support arrangement of the Bourdon tube; and Fig. 7 is a perspective view of the Bourdon tube and the supporting means therefor.

The present invention is shown in Figs. 1 and 2 applied to an electric range surface heating unit 10 having rod type heating units 11 and 12 with heating elements 13 embedded therein. The rod units are supported on a spider-like member 14 which rests at its ends on a lower reflector member 15 which in turn is supported on the flange ring 16. The construction of these members is well known in the art and the details thereof need not be described at length herein.

Referring now to Figs. 3 and 4, the vessel temperature responsive device of this invention is shown to include a vessel contacting member 20 having a vessel contacting disc 21, a hemispherically shaped reservoir 22 secured thereto, and a spider 23 secured to the outside of the hemisphere as by spinning over a flange from the wall of said hemisphere. The spider 23 is spaced from the vessel contacting disc 21 and cooperates with inwardly extending fingers 26 of clip members 27 to limit the motion of the contacting member 20 while still providing a freely self-aligning construction. Clip members 27 are engageable by the underside of disc 21 and limit the downward movement of the contacting member 20. The spider 23 and the clip members 27 are made preferably of low heat conductivity spring material, while the reservoir 22 and disc 21 are of high conductivity material. As will be apparent the clip members, being of spring material, permit easy assembly of the contacting member 20 into position.

A capillary tube 30 enters the hemispherical reservoir at 29 and is helically wound into a compression spring designated herein as 30a to provide the biasing force for the vessel contacting member 20. The base of the helix 30a nests in a recessed boss 31 which is centrally apertured for the capillary tube and is secured as by spinning over to an outer shield member 33. The upper portion of helix 30a is guided by a projection 34 on the base of the reservoir 22. The capillary tube 30 is provided with substantially right angle bends at the lower and upper end of boss 31 to prevent the removal therefrom. The capillary tube is of extremely small bore of the order of .010", and the section used for helix 30a is made preferably from full hard stainless steel so that the capillary can be used successfully as a spring biasing member. It has been found advantageous, in addition to the advantage of reducing the number of parts, to make the spring biasing means from the capillary tube when said tube has reliable spring properties. Attempts at use of a capillary of a low elastic limit material whether as a biasing member or purely as a fluid transmitting means results in a spurious biasing pressure between the vessel contacting member and the cooking vessel and possible failure due to excessive working of the material. The capillary tube is secured to the lower end of a support member 36 through a stress-relieving securing tab 37 (see Fig. 2). The capillary tube connects to a Bourdon element 38 mounted on the back of the controlling switch device 39 which in turn may be mounted as shown to the front of the electric range. The section of capillary tube between the helix 30a and the Bourdon 38 need not be of the same spring properties as that in the helical section 30a. Thus the section of tubing designated as 30b is preferably of heavy-walled small bore copper tubing thus providing a low cost connector having good resistance to abuse. The joint between the different types of tubing is disposed below the securing tab 37.

Immediately surrounding the vessel contacting member 20 is a substantially cup-shaped member 40, which is freely conductive to heat and is made preferably of high conductivity material such as aluminum. This cup-shaped member is provided at its upper end with a substantial vessel engaging flange 41 and at its lower end with a seat 42 for a spring 43 for biasing said member into engagement with a cooking vessel. This member is apertured at 44 to accommodate boss 31 while providing a clearance between these members that is kept as small as possible to prevent unrestricted flow of convection currents from below the heating unit from entering member 40. The clearance, however, should provide adequate passage for any cooking spillage and prevent binding between said members if member 20 is tilted. The clip members 27 previously mentioned are secured as by riveting to member 40 and have additionally provided opposed projections 45 for cooperating with apertures 46 provided in the outer shielding member 33 to limit the upward and downward movement of cup-shaped member 40. Fingers 45, as shown in Fig. 5, are notched to limit side movement of cup 40.

Outer shield member 33 is a thin cylindrical cup member (e. g. .010" in thickness) made preferably of stainless steel and is secured through projections provided therein by riveting to the support member 36. The thin-walled cup permits simple assemblage of inner cup 40 thereto, for merely distorting the cup 33 will allow the three fingers 45 to enter aperture 46. The helical spring 43 is disposed within the shielding cup 33, nesting at its lower end in a seat provided therein. Spillage holes 47 are also provided in the base of member 33.

The Bourdon element 38 used in the hydraulic system is comprised essentially of an arcuately shaped segment having a rather large radius of curvature but of angular dimension less than 180 degrees. The cross-section of the element is generally rectangular and has substantially zero opening at the lower range of temperatures. Satisfactory results were obtained when using a Bourdon element material of steel of the SAE 4130 type having a nominal wall thickness of .015". The mounting for the Bourdon element comprises an inwardly extending member 53 having a perpendicularly extending arm for securing to the control device 39 through screws or some other convenient fastening means. The capillary tube 30 communicates with the Bourdon element adjacent the base thereof while a small section of capillary tube adjacent thereto provides means for filling the system. The free end of the Bourdon element is provided with an arm 59 which is inwardly extending but substantially parallel to the mounting bracket and has a perpendicularly extending arm to which is mounted a short length of compensating bimetal 60 which in turn transmits motion of the Bourdon tube through a pin 61 to the control device. It should be noted that the shapes of the Bourdon element and the mounting and actuating arms are especially provided so that the Bourdon arrangement occupies a minimum of space in the rear of the control device 39.

The fluid system used in the temperature measuring arrangement disclosed herein is of the solid filled type. Such systems are well known in the art and are used primarily because of their substantial linearity and because the device is rendered insensitive to minor variations in the spring rate of the particular Bourdon element used. Thus if the wall thickness of the element or its elasticity were to vary, a relatively small error would be evident because motion would be resulting only from volumetric change and would not be affected by the change in resisting pressure offered by the Bourdon element.

As mentioned, the type of bourdon used is of the substantially rectangular cross section type having almost a zero opening at the lower temperatures. The capillary tube which transmits the volumetric change from member 20 to the bourdon is also of extremely small diameter. The effort generally is to keep the volume of these two elements as small as possible in relation to the volume of the bulb, so as to necessitate little or no compensation due to temperature changes which are not in the vicinity of the bulb. The use of a zero opening in the bourdon and the small opening in the capillary make the use of the solid filled system even more important because production tolerances are especially difficult to maintain in the constructions of this nature. In one particular embodiment of solid filled system the reservoir volume was calculated at .0138 cubic inch, a two-foot length of capillary tube at .0019 cubic inch, while the Bourdon element volume at filling temperature was calculated at .0016 cubic inch.

The use of the compensator 60 is considered advisable, however, for two reasons. First, it is essential that the internal volume of member 20 be kept as small as possible, and secondly, the temperature conditions below the heating unit and near the control switch are subject to wide variations. Thus even with small bore capillaries and zero opening Bourdon elements, substantial error can be introduced.

Motion of the free end of the Bourdon element 38 transmitted through compensator 60 acts to control the electrical energy to the heating until utilizing any one of the numerous systems already disclosed in the art, of which the device 39 is intended to be representative. The present invention is not concerned with the structure of device 39, and it suffices to note that this device comprises a switch connected in circuit with the heating unit and operable by pin 61.

When there is no vessel on the heating unit the inner and outer vessel engaging members 20 and 40 take up positions shown in Fig. 3, the spring members 30a and 43 urging them to their upward limits of the stroke where they are held by means of the fingers 26 and 45 of spring clips 277. When a vessel is placed on the heating unit, whether the vessel has an irregular bottom surface or not, the separate spring biasing members 30a and 43 cause the members 20 and 40 to independently engage the vessel. A slight concavity is provided at the center of the disc 21 of the vessel engaging member to take care of a vessel which might have a downwardly extending crown in the center bottom thereof.

It should be pointed out that the cup-shaped member 40 is extremely essential to the successful operation of this temperature measuring system, especially where shields of the simplest design and fewest in number are to be used. The provision of a large flange 41, the biasing force between the vessel and said flange, the use of a high conductivity material and the provision of a substantially enveloping structure results in an arrangement which establishes an atmosphere or environment for the member 20 which is primarily responsive to the vessel, the temperature of which is being measured. The outer shield 33 reduces the amount of heat transmitted to the member 40 from the heating unit. The use of a high reflective surface on the outer shield and on the outer surface of the member 40 are advisable for they tend to reduce the heat transmitted to the latter member.

It should be noted that the control device provided by this invention, as shown particularly in Fig. 3, comprises the combination of the temperature-responsive element 20, the associated substantially cup-shaped member 40 which is freely conductive to heat and which serves to define a substantially enclosed heat-insulating space adjacent said element and also to intercept extraneous heat and conduct it to the cooking vessel, and the shielding means 33 arranged in cooperative relation with said cup-shaped member to reduce transfer of extraneous heat thereto. In the specific form of the device as shown, the shielding means 33 is of such configuration as to surround and underlie the cup-shaped member 40.

It should be pointed out that the total force exerted by the combined biasing action of the spring members 30a and 43 cannot exceed a given portion of the weight of the lightest vessel and estimated minimum contents therefor that will be used with the surface heating unit. It has been found that it is more advantageous to distribute this total available biasing force between the vessel contacting member 20 and the immediately adjacent inner cup member 40 rather than applying the entire biasing force to member 20. It has also been found advantageous, especially where attempt is made to use the fewest number of shields, to distribute this available biasing force upon members like 20 and 40 which are kept closed to the center of the surface unit. If the force is distributed in part to an inner member like 20 and the remainder to a shield disposed at a substantial distance from the center, the efficiency of the temperature responsive system is lost, for the available unit pressure on the outer member is greatly reduced, the outer member is disposed closer to the heating unit and the extraneous heats therefrom, and the effect of a vessel with an uneven or battered bottom on the outer member is greatly exaggerated.

Of importance is the fact that the temperature responsive member 20 does not use or depend upon the air below the heating units. Prior art devices attempt to use the cool air in this space to help negate the effect of the extraneous heats from the heating units. Under actual operating conditions the temperature of the space may vary over large ranges and thus will adversely affect any temperature responsive member used.

The provision of a small cup-like structure occupying a minimum of space and disposed at the center of the heating unit has the additional advantage of permitting easy adaptation to most present commercial surface heating units.

Although this invention has been described in connection with a rod-type surface heating unit, it will be apparent that it is applicable to other types of cooking units such as the ceramic units or gas burners. There are also many other variations of this invention which will be apparent to those skilled in the art and which do not depart from the essence and scope of this invention as described and claimed herein.

I claim:

1. A control device for use in conjunction with a surface cooking unit having a small central opening, comprising a vessel temperature-responsive element disposed within said opening for engagement by the bottom of a cooking vessel placed on said cooking unit to receive heat from the cooking vessel by conduction, said element being in close proximity to the cooking unit, supporting and biasing spring means operatively associated with said element to effect good contact thereof with the bottom of the cooking vessel, means associated with said element substantially to thermally isolate said element from extraneous heat and to intercept such heat and freely conduct it to the cooking vessel, said last means comprising a substantially cup-shaped member freely conductive to heat extending into said opening and having its open end disposed for engagement with the bottom of the cooking vessel and defining a substantially enclosed heat-insulating space adjacent said element and also serving to intercept extraneous heat and to conduct it to the cooking vessel, supporting and biasing spring means operatively associated with said cup-shaped member to effect good contact thereof with the bottom of the cooking vessel independently of said element, and shielding means arranged in cooperative relation with said cup-shaped member to reduce transfer of extraneous heat thereto.

2. A control device according to claim 1, wherein said cup-shaped member directly surrounds said element in spaced relation thereto to provide the said heat-insulating space in directly enveloping relation to said element.

3. A control device according to claim 1, wherein said cup-shaped member is generally of hemispherical form to provide minimum heat dissipation area and minimum length of conductive path to its upper surface.

4. A control device according to claim 1, wherein each of said supporting and biasing spring means consists of an individual spring, and the springs mutually exert a predetermined biasing force less than the weight of the vessel and its contents.

5. A control device according to claim 1, wherein said shielding means is of such configuration as to surround the underlying said cup-shaped member.

6. A control device according to claim 5, wherein said shielding means has a wall in surrounding relation to said cup-shaped member, and said cup-shaped member has a flange at its upper end overlying said wall, and said flange has a depending skirt.

References Cited in the file of this patent

UNITED STATES PATENTS

| | | |
|---|---|---|
| 947,914 | Junkers | Feb. 1, 1910 |
| 1,691,136 | Schlaich | Nov. 13, 1928 |
| 1,904,615 | Bristol | Apr. 18, 1933 |
| 1,912,436 | Dashner | June 6, 1933 |
| 2,456,864 | Cole | Dec. 21, 1948 |
| 2,500,061 | Clark | Mar. 7, 1950 |
| 2,534,097 | Akeley | Dec. 12, 1950 |
| 2,549,461 | Haller | Apr. 17, 1951 |
| 2,575,084 | Akeley | Nov. 13, 1951 |